(12) United States Patent
Tsai et al.

(10) Patent No.: US 8,194,181 B2
(45) Date of Patent: Jun. 5, 2012

(54) CAMERA MODULE CAPABLE OF CALIBRATION

(75) Inventors: Wen-Ji Tsai, Sinjhuang (TW); Bo-Ren Yan, Cingshuei Township, Taichung County (TW); Ying-Chieh Hu, Wugu Township, Taipei County (TW); Jung-Wen Chang, Lujhu Township, Taoyuan County (TW)

(73) Assignee: Quanta Computer Inc., Taoyuan Shien (TW)

( * ) Notice: Subject to any disclaimer, the term of this patent is extended or adjusted under 35 U.S.C. 154(b) by 311 days.

(21) Appl. No.: 12/461,190

(22) Filed: Aug. 4, 2009

(65) Prior Publication Data
US 2010/0182497 A1    Jul. 22, 2010

(30) Foreign Application Priority Data

Jan. 22, 2009    (TW) ............................... 98201307 U

(51) Int. Cl.
*H04N 5/225* (2006.01)
*H01L 21/00* (2006.01)
*G02B 3/02* (2006.01)
*G02B 13/18* (2006.01)

(52) U.S. Cl. .......... 348/374; 348/373; 348/340; 438/64; 438/69; 359/715

(58) Field of Classification Search .......... 348/373–376; 439/64, 69, 55; 257/432–434; 359/359, 359/715
See application file for complete search history.

(56) References Cited

U.S. PATENT DOCUMENTS

| | | | |
|---|---|---|---|
| 7,270,274 B2 * | 9/2007 | Hennick et al. ........... 235/462.43 |
| 7,646,427 B2 * | 1/2010 | Sato et al. ..................... 348/374 |
| 2001/0030682 A1 * | 10/2001 | Tserkovnyuk et al. ......... 348/47 |
| 2004/0001157 A1 * | 1/2004 | Chan et al. .................... 348/335 |
| 2004/0263792 A1 * | 12/2004 | Shiraishi et al. ................ 353/31 |
| 2005/0041310 A1 * | 2/2005 | Higashihara .................. 359/819 |
| 2006/0012705 A1 * | 1/2006 | Van Beenen .................. 348/375 |
| 2006/0170814 A1 * | 8/2006 | Tsai ............................... 348/357 |
| 2009/0174785 A1 * | 7/2009 | Uchida ........................ 348/222.1 |

* cited by examiner

*Primary Examiner* — Sinh Tran
*Assistant Examiner* — Christopher K Peterson
(74) *Attorney, Agent, or Firm* — Rabin & Berdo, PC

(57) ABSTRACT

A camera module includes a circuit board; a lens electrically connected to the circuit board; a adjusting base disposed on the circuit board and having at least two through-hole disposed adjacent to opposite sides of the lens; at least two fixed posts; at least two adjusting screw respectively passing through the through-holes of the adjusting base so as to be secured in the fixed posts; and at least two springs respectively encircling the adjusting screws, wherein two ends of each spring are positioned against the adjusting base and one of the fixed post respectively.

11 Claims, 7 Drawing Sheets

CAMERA MODULE CAPABLE OF CALIBRATION

RELATED APPLICATIONS

This application claims priority to Taiwan Application Serial Number 98201307, filed Jan. 22, 2009, which is herein incorporated by reference.

BACKGROUND

1. Field of Invention

The present invention relates to a touch panel. More particularly, the present invention relates to an optical sensor-type touch panel.

2. Description of Related Art

As the competition in the market of consumer electronics is getting more and more intense, the electronic devices equipped with touch panel are also getting popular. Currently, mainstream techniques in manufacturing touch panels include, among the others, resistor-type and capacitor-type touch panels; nowadays, however, optical-type touch panels also appear to be promising.

Optical-type touch panels utilize an optical detector to detect a touch on the touch panel. Generally, an optical-type touch panel has a pair of camera modules respectively disposed at two corners thereof. The camera modules can detect the shadow caused by a hand, a finger, or a stylus, and therefore determine the touch position on the panel.

In view of the foregoing, the accuracy and sensitivity of the optical-type touch panels would be severely jeopardized if the position and focal point of the camera module were not carefully calibrated. However, the calibration process for the complicated camera module is quite burdensome, and the results of the calibration are often unsatisfactory.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a camera module that calibrates the position of the lens by rotating adjusting screws.

According to one embodiment of the present invention, the camera module comprises a circuit board, a lens, an adjusting base, at least two fixed posts, at least two adjusting screws, and at least two springs. The lens is electrically connected to the circuit board. The adjusting base is disposed on the circuit board. The adjusting base comprises at least two through-holes, and the through-holes are respectively disposed on two opposite sides of the lens. The adjusting screws respectively pass through the through-holes of the adjusting base so that the adjusting screws are respectively secured in the fixed posts. The springs respectively encircle the adjusting screws, and two ends of each of the springs are respectively positioned against the adjusting base and the fixed posts.

According to another embodiment of the present invention, the camera module comprises a circuit board, at least one fixed post, an image-sensing chip, an adjusting base, at least one lens, an elastomer, and at least one adjusting screw. The fixed post is fixed on the circuit board. The image-sensing chip is electrically connected to the circuit board. The adjusting base comprises at least one through-hole. The lens is disposed in the adjusting base. The elastomer is sandwiched between the adjusting base and the circuit board. The adjusting screw passes through at least the through-hole of the adjusting base and the elastomer so as to be secured in the fixed posts.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present embodiment may be constructed or utilized. The description sets forth the functions of the embodiment and the sequence of steps for constructing and operating the example. However, the same or equivalent functions and sequences may be accomplished by different examples.

Figure 1:
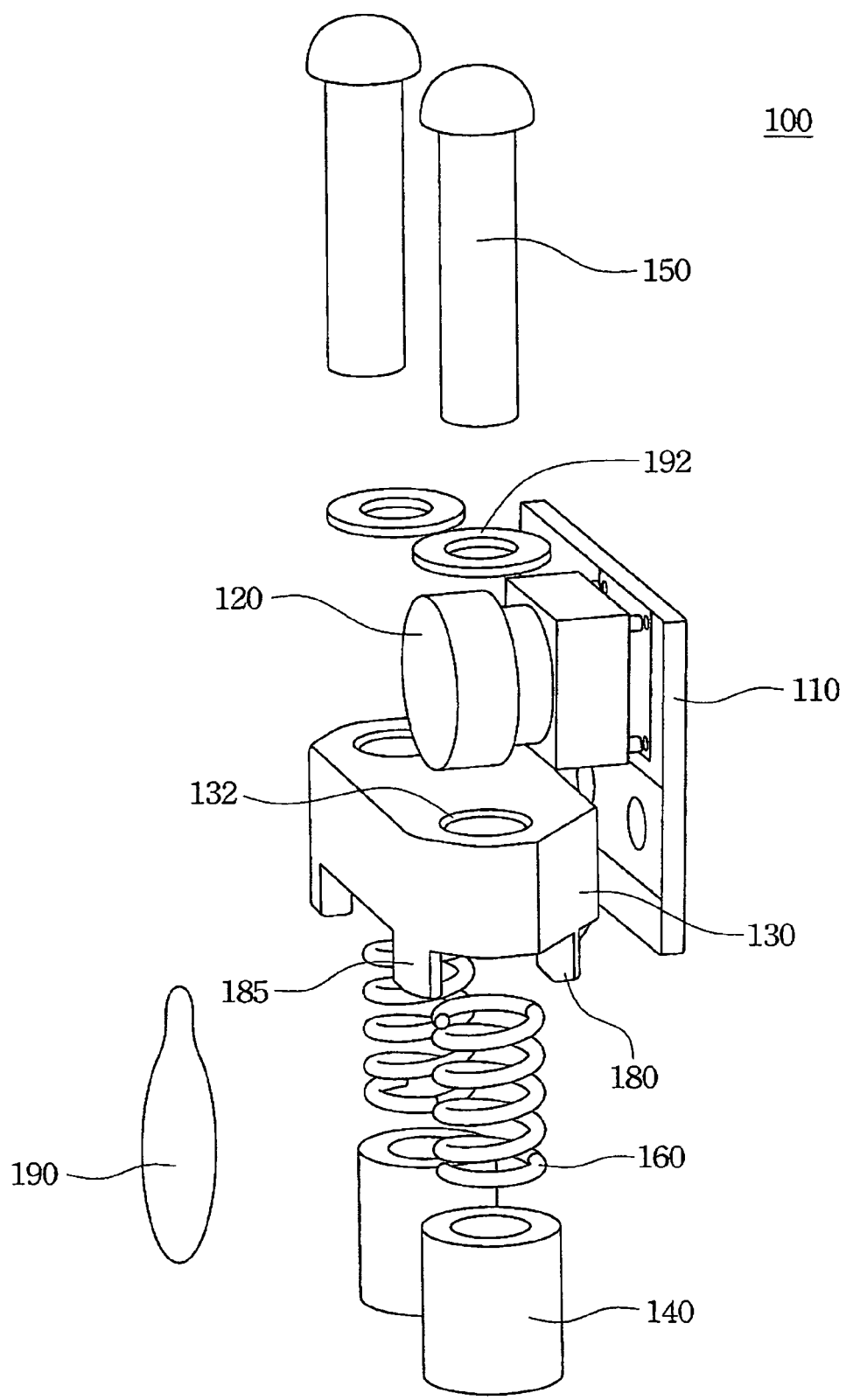
FIG. 1 is an explosion diagram illustrating a camera module according to one embodiment of the present invention.

FIG. 1 is an explosion diagram illustrating a camera module 100 according to one embodiment of the present invention. In FIG. 1, a camera module 100 is depicted to comprise a circuit board 110, a lens 120, an adjusting base 130, at least two fixed posts 140, at least two adjusting screws 150, and at least two springs 160. The lens 120 is connected to the circuit board 110. The adjusting base 130 is disposed on circuit board 110. The adjusting base 130 comprises at least two through-holes 132, and said through-holes 132 are respectively disposed on two opposite sides of the lens 120. The fixed posts 140 are disposed on a fixed surface such as a casing. Each of the adjusting screws 150 passes through the through-hole 132 of the adjusting base 130 so that the adjusting screw 150 is secured in the respective fixed post 140. The springs 160 respectively encircle the adjusting screws 150, and two ends of each of the springs 160 are positioned against the adjusting base 130 and the fixed post 140, respectively.

As can be appreciated from the foregoing, the lens 120 is linked with the adjusting base 130, and hence, when the adjusting screws 150 are rotated, the adjusting base 130 are driven to move the lens 120 correspondingly which in turns may adjust the relative position between the lens 120 and the fixed posts 140. Specifically, the adjusting base 130 provides two calibration modes—leveling calibration and rotary calibration, which will be described in more detail below in conjunction with FIG. 2 and FIG. 3.

Figure 2:
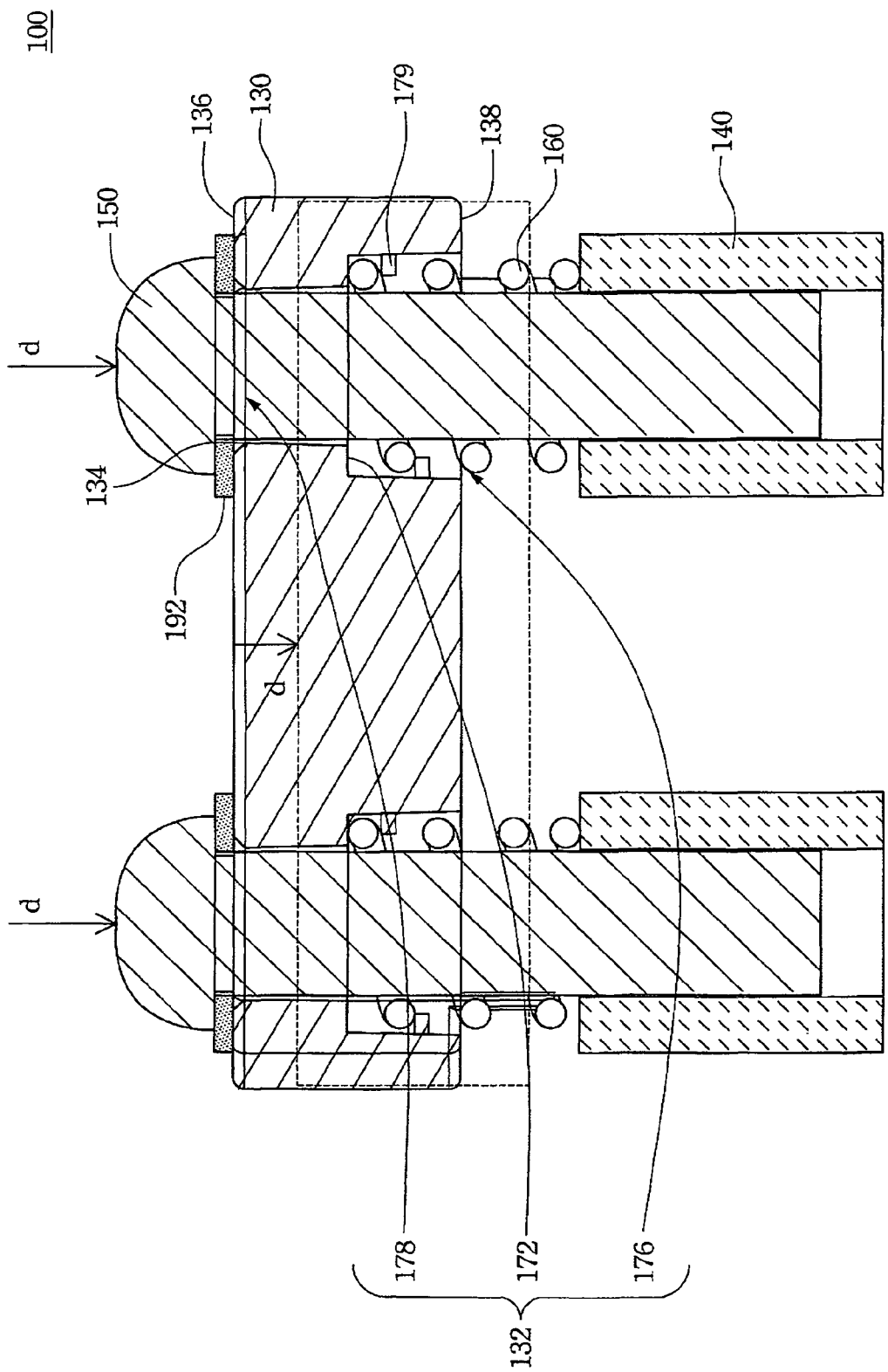
FIG. 2 is a cross-sectional view of the camera module of FIG. 1 in a leveling calibration mode.

FIG. 2 is a cross-sectional view of the camera module 100 of FIG. 1 in a leveling calibration mode. As shown in FIG. 2, in order to reduce the distance between the lens 120 and the fixed posts 140, the two adjusting screws 150*a* are simultaneously screwed into the fixed posts 140 by a distance "d", whereby driving the adjusting base 130 to move the lens 120 downward by the distance "d" so that the adjusting base 130 is positioned at the dashed area shown in the FIG. 2. That is, the lens 120 is moved closer to the fixed posts 140. On the other hand, in order to increase the distance between the lens 120 and the fixed posts 140, the two adjusting screws 150 are simultaneously screwed out of the fixed posts 140, whereby driving the adjusting base 130 to move the lens 120 upward in unison; that is, the lens 120 is moved away from the fixed posts 140.

Figure 3:
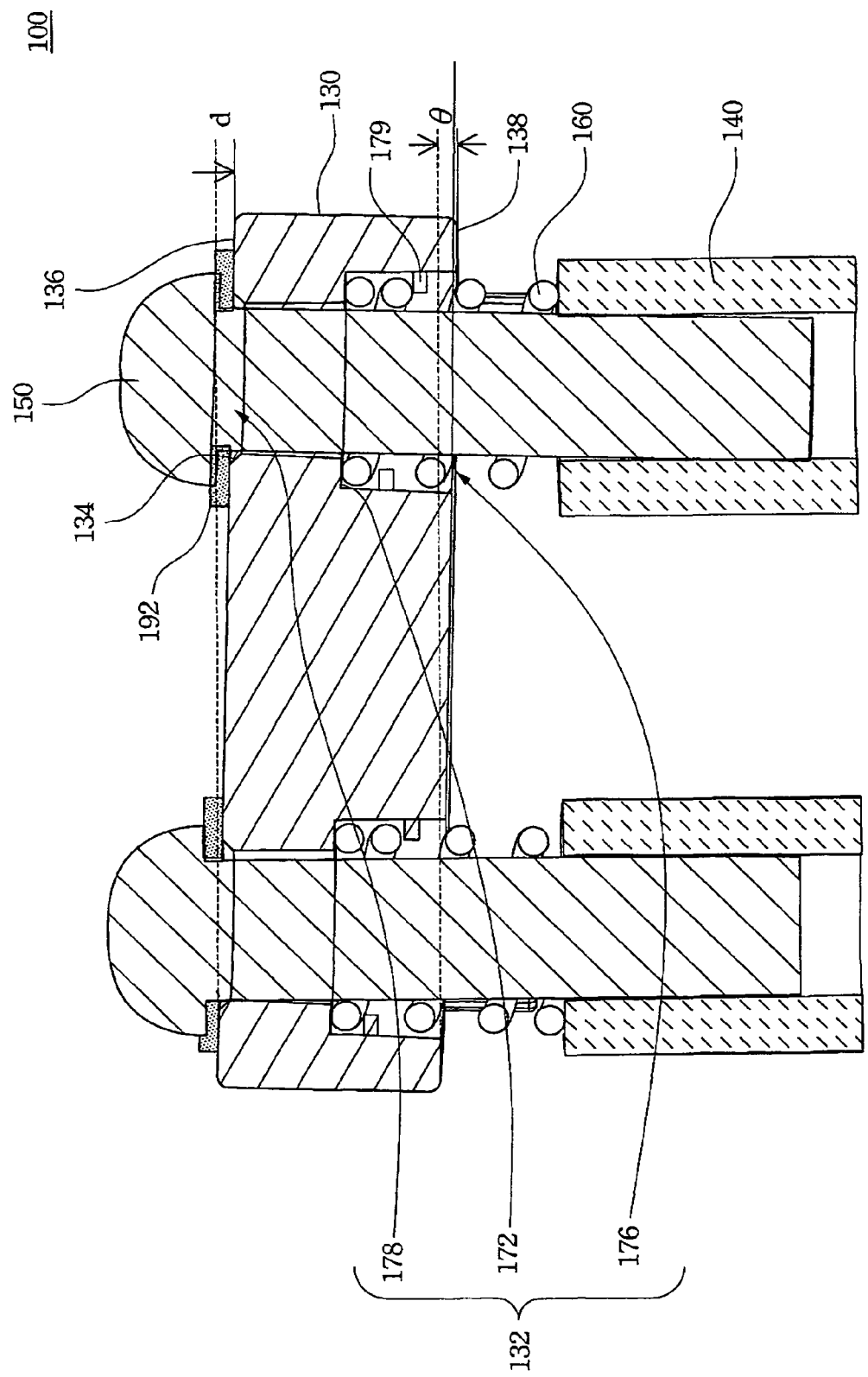
FIG. 3 is a cross-sectional view of the camera module of FIG. 1 in a rotary calibration mode.

FIG. 3 is a cross-sectional view of the camera module 100 of FIG. 1 in a rotary calibration mode. In order to rotate the lens 120, as shown in FIG. 3, one of the two adjusting screws 150 is fixed, whereas the other adjusting screw 150 is screwed into the fixed post 140 by a distance "d" so that the adjusting base 130 is driven to rotate the lens 120 by an angle "θ". As can be appreciated, it is possible to simultaneously rotate both of the adjusting screws 150 without fixing one of the adjusting screws 150, as long as there is a relative movement between the two adjusting screws 150.

In order to provide sufficient rotational freedom for the adjusting base 130, a pre-determined space between the through-holes 132 of the adjusting base 130 and the adjusting screws 150 is provided in advanced, so that the adjusting base 130 is rotated in relative to the adjusting screws 150. Specifically, each of the through-holes 132 can have a conical shape. In addition, the through-holes 132 may further comprise a chamfer 134. The chamfer 134 is disposed on an edge of the through-holes 132 that is adjacent to a top surface 136 of the adjusting base 130. Said top surface 136 adjoins to the lens 120.

Moreover, in order to fix the springs 160 in position, a stage difference 172 can be provided in the through-hole 132, so that the respective springs 160 can be fixed therein. For each through-hole 132, a diameter of the opening 176 disposed at the bottom surface 138 is larger than that of the opening 178 disposed at the top surface 136. The spring 160 enters the through-hole 132 via the opening 176 to reach the stage difference 172 and is pressed against the adjusting base 130 therefrom, as shown in FIG. 2 and FIG. 3. Optionally, similar structures can be provided in the fixed posts 140 to accommodate and fix the springs 160.

A bump 179 is configured in each through-hole 132 to prevent the springs 160 from falling out of the through-hole 132 during operation. Said bump 179 may lock the spring 160 as the spring 160 enters the through-hole 132, so that the spring 160 will not fall out of the through-hole 132 during operation.

Referring to FIG. 1, a pair of first stops 180 and a pair of second stops 185 are provided on the adjusting base 130 to restrict the pitching degrees of freedom. Specifically, each of the first stops 180 protrudes from the adjusting base 130 toward the respective fixed post 140, whereby preventing the adjusting base 130 from leaning backward that would otherwise results in the imaging error of the lens 120. Each of the second stops 185 also protrudes from the adjusting base 130 toward the fixed posts 140 and is spaced from the first stop 180 by the through-holes 132 and first stops 180 whereby preventing the adjusting base 130 from leaning forward that would otherwise results in an imaging error of the lens 120.

After calibration, the adjusting base 130, the springs 160, and the fixed posts 140 are bound together by an adhesive 190 or other fixing means such as riveting or locking means. As such, arbitrary adjusting the position of the lens 120 by the users that would otherwise results in the imaging error is prevented.

In addition, a pad 192 can be provided between each adjusting screw 150 and the adjusting base 130. The pad 192 is an optional component, and it will be apparent to those skilled in the art that the pad 192 can be provided depending on the requirements of various applications.

Figure 4:
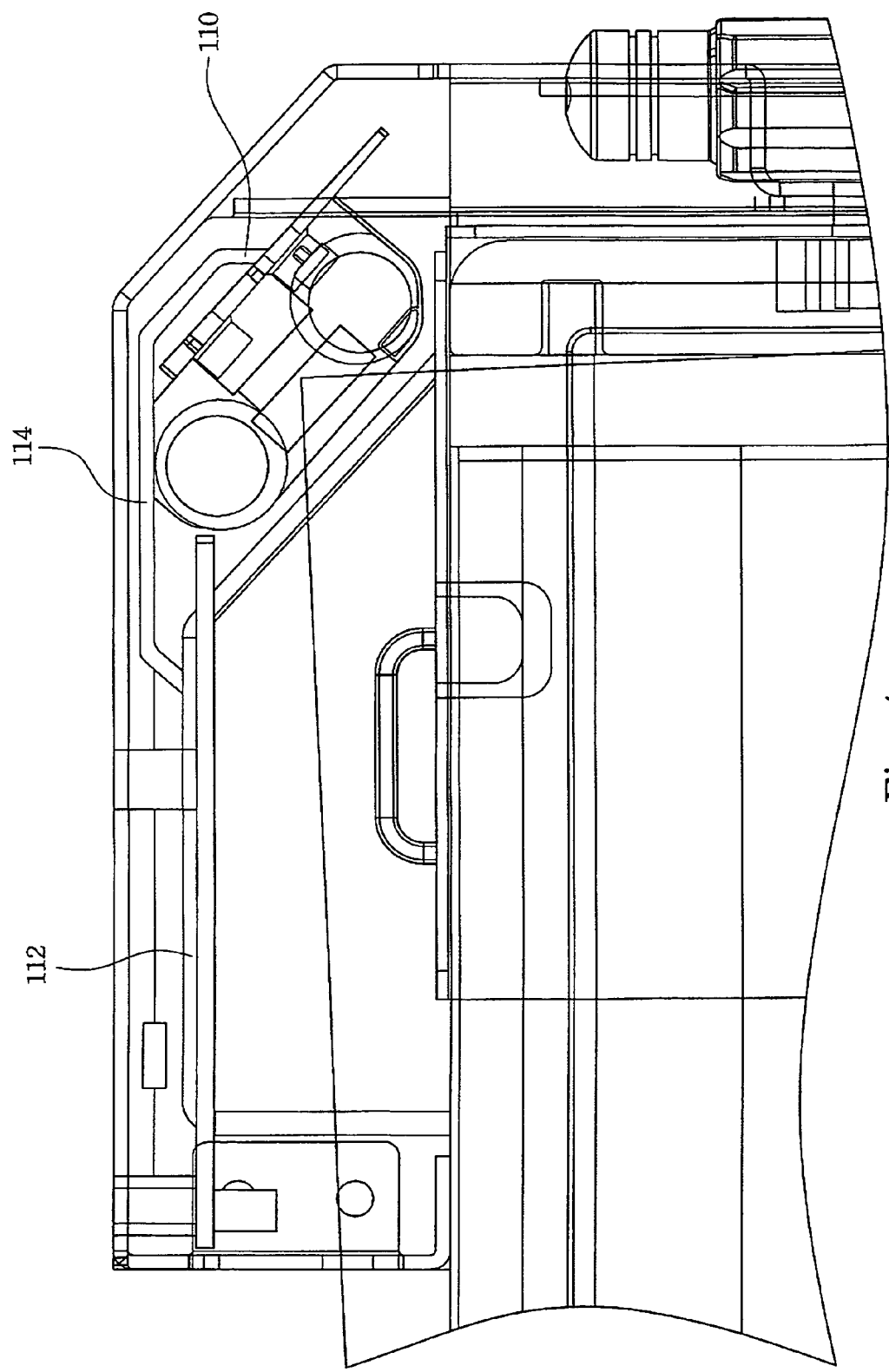
FIG. 4 is a top view diagram illustrating the camera module of FIG. 1 being installed in position.

FIG. 4 is a top view diagram illustrating the camera module 100 of FIG. 1 being installed in position. As shown in FIG. 4, if the space of the circuit board 110 is not sufficient, an additional extension circuit board 112 can be provided. The extension circuit board 112 is electrically connected to the circuit board 110. Specifically, a flexible flat cable 114 can be provided to electrically connect the circuit board 110 and the extension circuit board 112.

Figure 5:
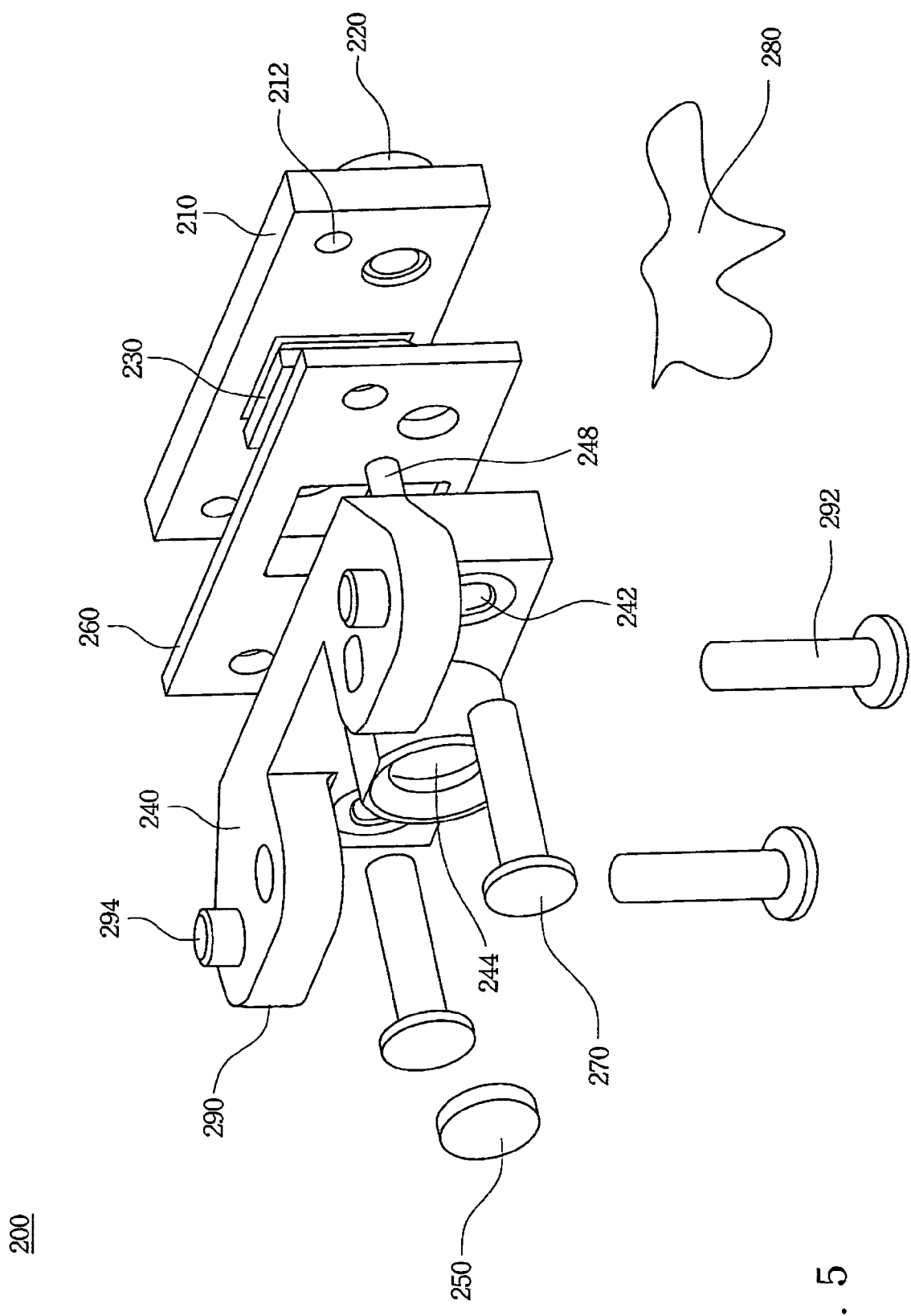
FIG. 5 is an explosion diagram illustrating a camera module according to another embodiment of the present invention.

FIG. 5 is an explosion diagram illustrating a camera module 200 according to another embodiment of the present invention. As shown in FIG. 5, a camera module 200 is depicted to comprise a circuit board 210, at least one fixed post 220, an image-sensing chip 230 such as a charge coupled device (CCD) or a complementary metal-oxide-semiconductor (CMOS) device, an adjusting base 240, at least one lens 250, an elastomer 260 and at least one adjusting screw 270. The fixed post 220 is fixed on the circuit board 210. The image-sensing chip 230 is electrically connected to the circuit board 210. The adjusting base 240 comprises at least one through-hole 242. The lens 250 is disposed in the adjusting base 240. The elastomer 260 is sandwiched between the adjusting base 240 and the circuit board 210. The adjusting screw 270 passes through at least the through-hole 242 of the adjusting base 240 and the elastomer 260, thereby securing the adjusting screw 270 in the fixed posts 220.

Specifically, the fixed post 220 is fixed on a face, which is positioned away from the adjusting base 240, of the circuit board 210. In this case, besides passing through the through-hole 242 of the adjusting base 240 and the elastomer 260, the adjusting screw 270 would pass the circuit board 210 as well; hence the adjusting screw 270 can be secured in the fixed post 220. In addition, at least one positioning post 248 can be configured on the adjusting base 240. The positioning post 248 can be lodged into a positioning recess 212 of the circuit board 210 so as to position the adjusting base 240.

The elastomer 260 may envelop the image-sensing chip 230 to prevent ambient light from passing through the gaps between the adjusting base 240 and the circuit board 210 and reaching the image-sensing chip 230 that would otherwise result in noise interference. Specifically, the elastomer 260 can be, such as, a foam or a rubber. In addition, the color of the elastomer 260 can be black or other light-absorbing colors.

Figure 6:
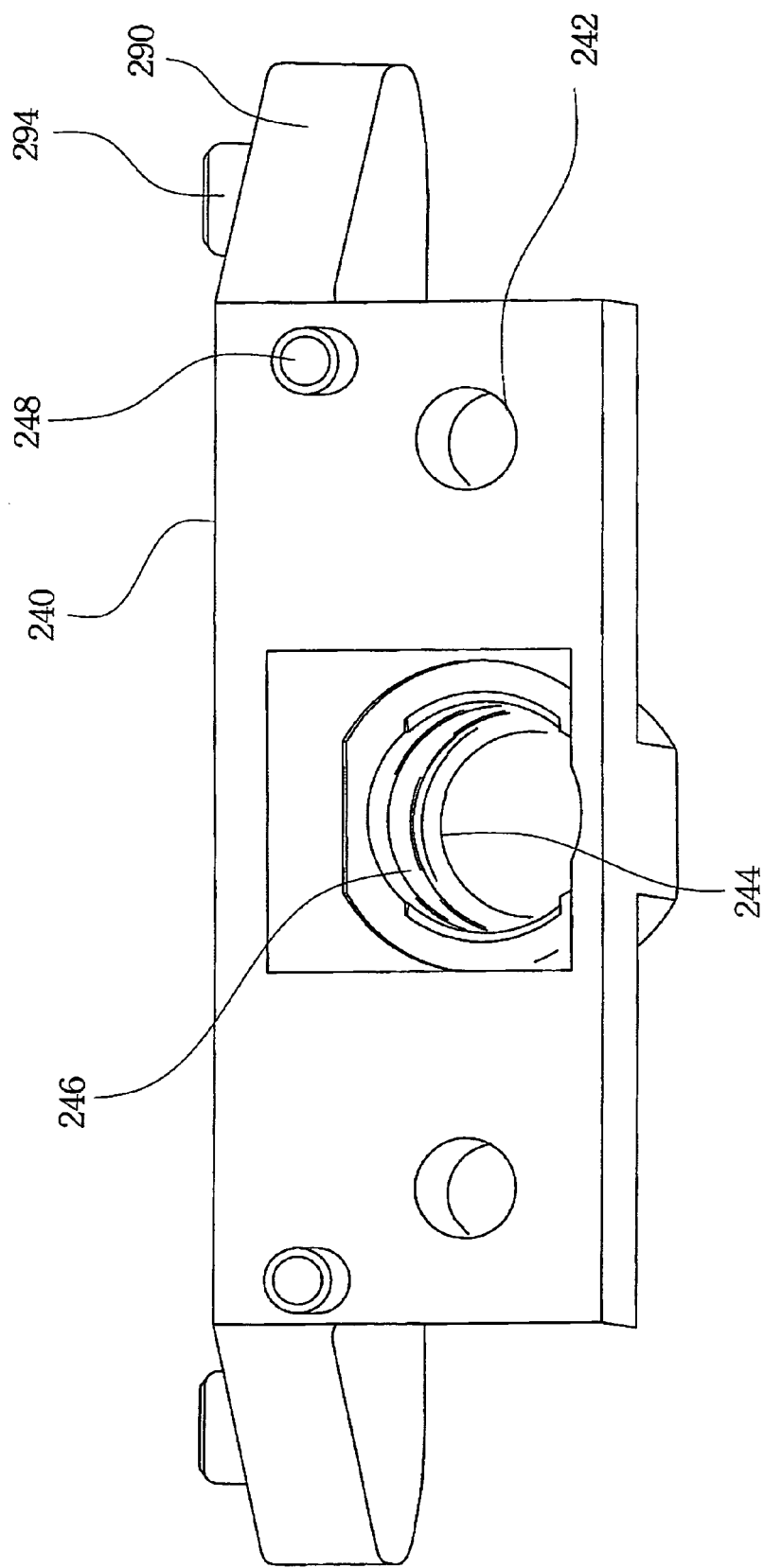
FIG. 6 is a rear view of the adjusting base of FIG. 5.

FIG. 6 is a rear view of the adjusting base 240 of FIG. 5. As shown in FIG. 6, the adjusting base 240 may comprise a hollow cylinder 244 and at least one rabbet 246. The hollow cylinder 244 passes throughout the adjusting base 240. The rabbet 246 is disposed on the inner side of the hollow cylinder 244, and thus the lens 250 can be lodged into the rabbet 246. Specifically, when multiple lens 250, such as three lens, are employed, multiple rabbets 246, such as three rabbets, are provided, so that each lens is lodged into and fixed in a rabbet 246.

As stated above, the lens 250 is linked with the adjusting base 240, and hence, as long as the adjusting screw 270 is rotated, the adjusting base 240 would be driven to move the lens 250 correspondingly, which in turns adjusts the focal point of the lens 250. Specifically, the adjusting base 240 provides both up-and-down calibration and left-and-right calibration modes, which will be described in more detail below in conjunction with FIG. 7.

Figure 7:
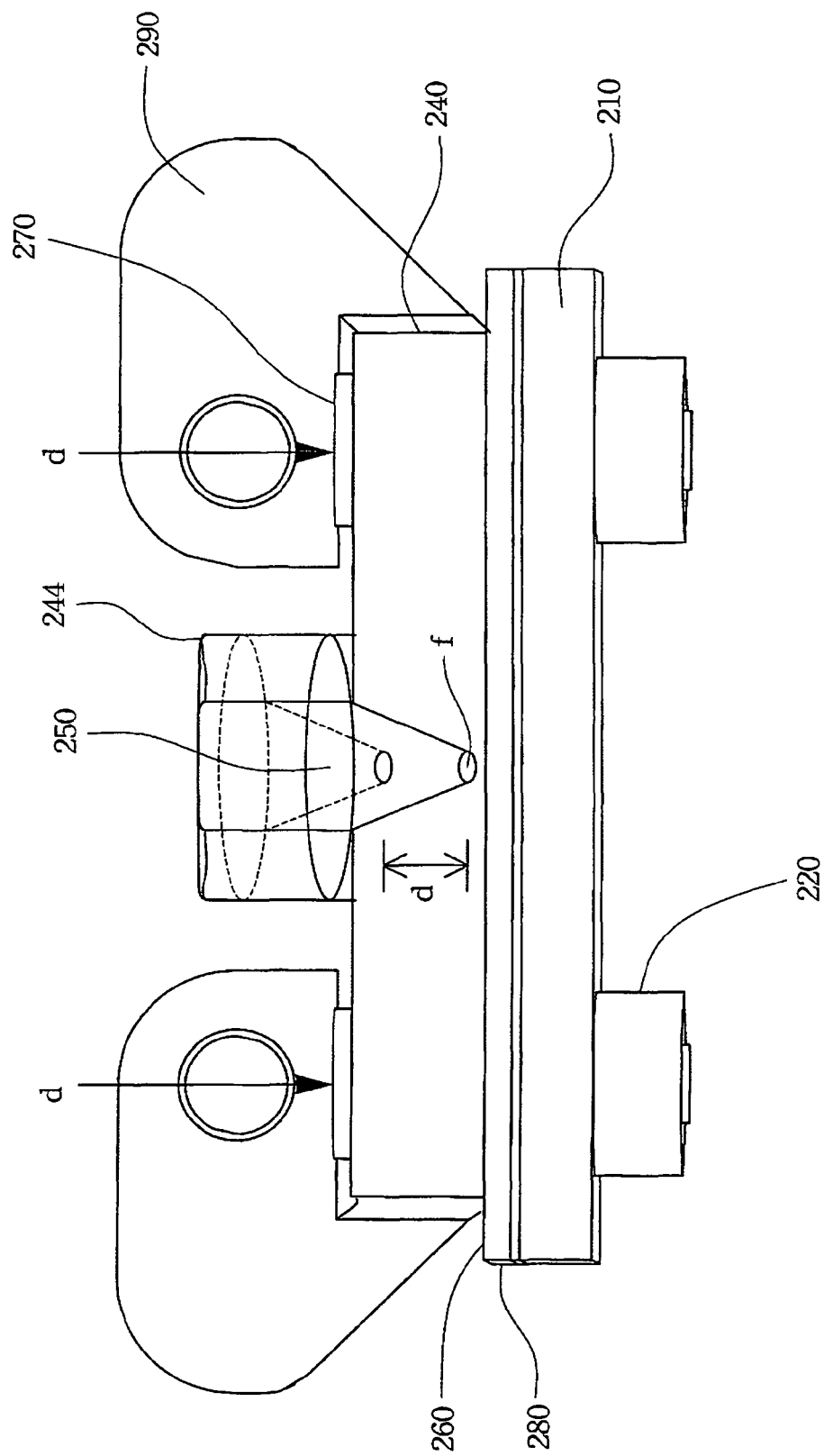
FIG. 7 is a top view diagram illustrating the camera module of FIG. 5 during the focal point calibration process.

FIG. 7 is a top view diagram illustrating the camera module 200 of FIG. 5 during the focal point (f) calibration process. As shown in FIG. 7, when it is desired to move the focal point f of the lens downward, the two adjusting screws 270 are simultaneously screwed into the fixed posts 220, and whereby the adjusting base 240 is driven to move the lens 250 downward in unison. That is, the lens 250 is moved closer to the image-sensing chip. As such, the focal point f of the lens is lowered in accordance with lens 250. On the other hand, when the focal point f of the lens is to be adjusted upward, the two adjusting screws 270 are simultaneously screwed out of the fixed posts 220, and thereby the adjusting base 240 is driven to move the focal point of the lens upward in unison, that is, the focal point of the lens is moved away from the image-sensing chip 230.

When the focal point f of the lens is to be adjusted in a left-and right mode, one of the adjusting screws 270 can be fixed, whereas the other adjusting screw 270 is screwed into the fixed post 220 so that the adjusting base 240 is driven to rotate the lens 250. In this case, the focal point f of the lens will be correspondingly shifted to the right side or the left side. As can be appreciated, it is possible to make both of the adjusting screws 270 rotate simultaneously without fixing one of the adjusting screws 270, as long as there is relative movement between the two adjusting screws 270.

Similarly, in order to provide sufficient rotational freedom for the adjusting base 240, a predetermined space between the through-holes 242 of the adjusting base 240 and the adjusting screws 270 is provided in advanced, so that the adjusting base 240 can rotate in relative to the adjusting screws 270. Other embodying features of this embodiment are similar to those disclosed with respect to the previous embodiment of the present invention. For example, the through-holes 242 can have a conical shape and/or the through-holes 242 may have a chamfer. Thus, those skilled in the art can configure the through-holes 242 depending on the requirements of various applications.

Referring to FIG. 5, after calibration, the adjusting base 240, the elastomer 260, and the circuit board 210 are bound together by appropriate means such as an adhesive 280. As such, arbitrary adjusting the position of the lens 250 by the users that would otherwise results in the shift of the focal point of the lens is prevented.

Moreover, at least one fixation wing 290 can be disposed on the adjusting base 240. The fixation wing 290 extends outwardly from the adjusting base 240. During the installation process, at least one fixation screw 292 can be used to secure the fixation wing 290 onto a fixed surface such as a casing. In addition, the fixation wing 290 may have at least one positioning post 294 disposed thereon. The positioning post 294 can be lodged into the positioning recess of the fixed surface so as to dispose the fixation wing 290 in position.

It will be understood that the above description of embodiments is given by way of embodiment only and that various modifications may be made by those with ordinary skill in the art. The above specification and examples provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A camera module, comprising:
   a circuit board;
   at least one fixed post fixed on the circuit board;
   an adjusting base comprising at least one through-hole;
   at least one lens disposed in the adjusting base;
   an elastomer sandwiched between the adjusting base and the circuit board, and having a penetrating opening;
   an image-sensing chip electrically connected to the circuit board, arranged between the circuit board and the adjusting base, and extending into the penetrating opening of the elastomer for aligning with the lens; and
   at least one adjusting screw passing through at least the through-hole of the adjusting base and a through-hole of the elastomer thereby securing the adjusting screw in the fixed post.

2. The camera module according to claim 1, wherein the fixed post is fixed on a surface of the circuit board that is away from the adjusting base, and the adjusting screw further passes through the circuit board to secure the adjusting screw in the fixed post.

3. The camera module according to claim 1, wherein the adjusting base comprising:
   a hollow cylinder passing through the adjusting base; and
   at least one rabbet disposed on the inner side of the hollow cylinder for accommodating the lens.

4. The camera module according to claim 1, wherein the elastomer envelops the image-sensing chip.

5. The camera module according to claim 4, wherein the elastomer comprises a black foam.

6. The camera module according to claim 4, wherein the elastomer is a black rubber.

7. The camera module according to claim 1, wherein the through-hole has a conical shape.

8. The camera module according to claim 1, further comprising:
   means for binding the adjusting base, the elastomer and the circuit board.

9. The camera module according to claim 1, further comprising:
   at least one fixation wing extending outwardly from the adjusting base; and
   at least one fixation screw for securing the fixation wing.

10. The camera module according to claim 3, wherein the through-hole has a conical shape.

11. The camera module according to claim 10, further comprising:
    means for binding the adjusting base, the elastomer and the circuit board.

* * * * *